Aug. 5, 1924.

T. G. CRAVER 1,503,488

DISPLAY DEVICE

Filed April 1, 1922   2 Sheets-Sheet 1

Inventor
T. G. Craver
By C. A. Snow & Co.
Attorneys

Aug. 5, 1924.

T. G. CRAVER 1,503,488

DISPLAY DEVICE

Filed April 1, 1922      2 Sheets-Sheet 2

Inventor
T. G. Craver
By C. A. Snowbles.
Attorney.

Patented Aug. 5, 1924.

1,503,488

UNITED STATES PATENT OFFICE.

THOMAS G. CRAVER, OF MOUNT HOPE, WEST VIRGINIA, ASSIGNOR OF ONE-FOURTH TO M. L. PARKER, OF MOUNT HOPE, WEST VIRGINIA, AND ONE-FOURTH TO LEM DOUGLAS, OF SCARBRO, WEST VIRGINIA.

DISPLAY DEVICE.

Application filed April 1, 1922. Serial No. 548,734.

*To all whom it may concern:*

Be it known that I, THOMAS G. CRAVER, a citizen of the United States, residing at Mount Hope, in the county of Fayette and State of West Virginia, have invented a new and useful Display Device, of which the following is a specification.

This invention relates to machines for projecting stereopticon slides, the primary object of the invention being to provide means for automatically moving the slides to positions in the path of travel of the light rays from a projecting machine.

Another object of the invention is to provide automatically controlled means for establishing a novel color scheme, whereby the attractiveness and beauty of the picture projected will be greatly enhanced.

A still further object of the invention is to provide a support for the rotary carriage having novel adjusting means, thereby adapting the support for use in connection with carriages of various diameters.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1:
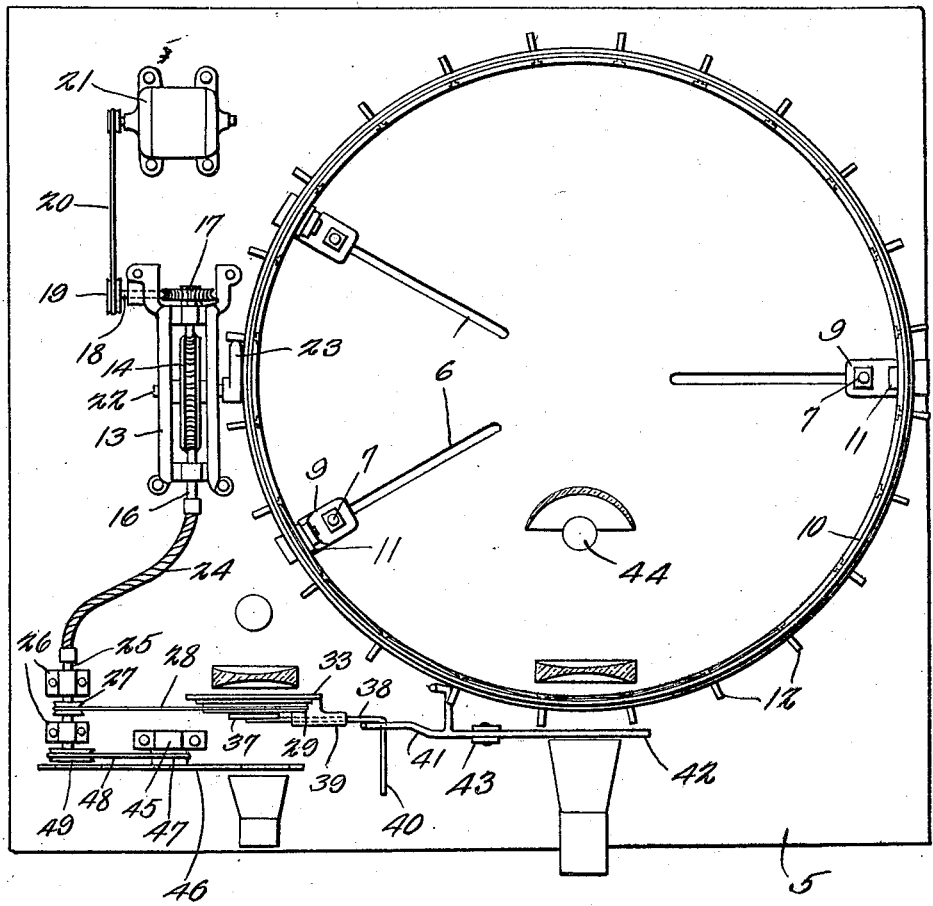
Figure 1 is a plan view of a projecting apparatus constructed in accordance with the present invention.
Figure 2:
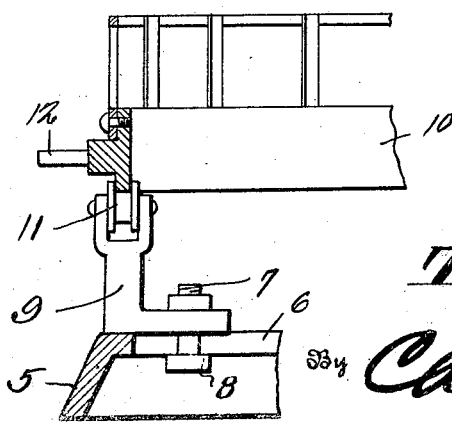
Figure 2 is a fragmental detail view disclosing one of the supporting bearings as supporting a portion of the rotatable carriage.
Figure 3:
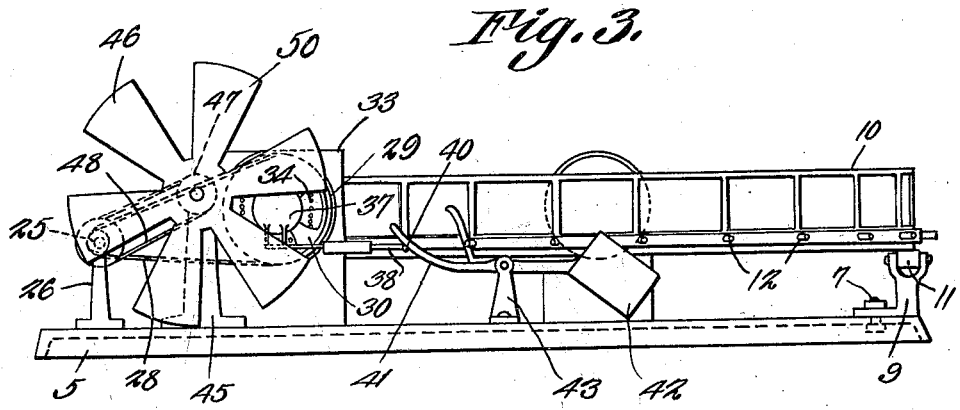
Figure 3 is an elevational view of the machine.
Figure 4:
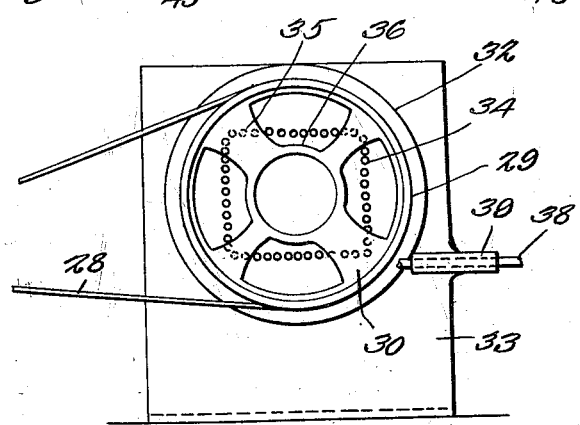
Figure 4 is an elevational view of the portion of the machine employed for controlling the projecting of the master slide.
Figure 5:
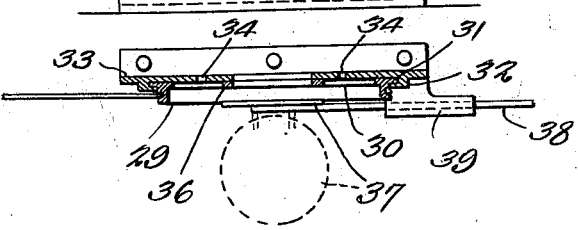
Figure 5 is a sectional view through a portion of the machine and disclosing the shutter for controlling the projection of the master slide in dotted lines.
Figure 6:
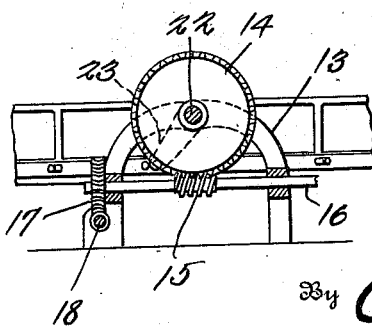
Figure 6 is a detail view disclosing the mechanism for controlling the movements of the rotatable carriage.

Referring to the drawings in detail, the reference character 5 designates the base or support for the machine, which may be formed of any suitable material. The support is formed with radiating slots 6 designed to accommodate the bolts 7 which are formed with heads 8 that contact with the under surface of the base 5. The bolts 7 secure the bearings 9 to the base 5, the upper portions of the bolts being shown as extending through suitable openings in the bearings 9, the lower portions of the bolts extending into the slots 6, so that the bearings may be moved longitudinally of the slots 6, for purposes to be hereinafter more fully described.

The rotatable carriage forming an important feature of the invention, is in the form of a band 10, the lower edge of which is positioned in the rollers 11 carried by the bearings 9, it being understood however that one of the rollers is formed with a relatively flat surface to eliminate binding between the carriage and rollers, and permit the carriage to rotate freely. Thus it will be seen that due to this construction, the carriage is supported to revolve in a predetermined plane.

Extending laterally from the carriage 10 are the arms 12 which are disposed in spaced relation with each other, the spaces between the arms being equal to the width of the plates, projected, so that a plate may be positioned between each of the adjacent arms.

Suitable means not shown, may be provided for permitting the slides which are mounted on the carriage to be readily and easily inserted therein. Supported on the base 5 and disposed adjacent to one side of the rotatable carriage, is a frame 13 in which is mounted the pinion 14 that receives motion from the worm 15 which in turn is mounted on the shaft 16 that carries a pinion 17.

A worm is disposed on one end of the shaft 18 and is in mesh with the pinion 17 to communicate motion thereto, motion being communicated to the shaft 18 through the pulley 19, flexible member 20 and prime mover 21, which in the present showing is in the form of an electric motor. Carried on the shaft 22 that supports the pinion 14 is an arm 23 which revolves with the shaft, the arm being of a weight to contact with the arms 12 of the rotatable carriage 10 to cause the carriage to rotate with a step by step motion, whereby each complete rotation of the arm 23 moves the rotatable carriage 10 to bring another slide before the projecting lens of the machine.

A flexible shaft 24 has one end thereof connected to the shaft 16, and imparts movement to the shaft 25 which is mounted in the bearings 26.

Mounted on the shaft 25 is a pulley 27 over which the belt 28 operates, which belt operates over the pulley 29 that is formed on the rotatable shutter 30. The shutter 30 is formed with a flange 31 mounted within the support 32 formed on the plate 33, which plate is disposed in a vertical position, and is formed with a series of openings 34 to permit light rays to pass therethrough. As shown this shutter 30 includes relatively wide arms 35 and a central ring member 36, the central ring member being open to permit a picture to be projected therethrough.

From the foregoing it will be seen that as the shutter is rotated, the arms 35 move over the openings 34 to close the openings at predetermined intervals, thus giving the appearance of a moving line of light around the picture projected for attracting the attention of persons passing near the machine.

In order that the picture projected through the central portion of the ring member 36 will be displayed at predetermined intervals, a pivoted shutter 37 is provided, which shutter is preferably circular in formation and is designed to close the opening in the ring member 36. This shutter 37 is mounted on one end of the shaft 38, which is positioned in the bearing 39, the opposite end thereof extending at right angles as at 40, where the same lies in the path of travel of the arm 41 of the shutter 42 to be hereinafter more fully described.

Thus it will be seen that as the arm 41 is moved downwardly, the shutter 42, is moved upwardly. This shutter 42 is pivotally mounted in the bearing 43 and is constructed to lie in front of the projecting opening of the machine to cut off the light from the light producing medium 44, while the master slide is being displayed.

Positioned on the base 5 is a bearing support 45 which supports a shaft that carries the color shutter 46, there being provided a pulley 47 at the rear thereof, which pulley accommodates the belt 48 that passes over the pulley 49 carried on the outer end of the shaft 25 so that the color shutter 46 revolves simultaneously with the shutter 30.

This color screen embodies a plurality of radiating blades 50, the blades being constructed of translucent material, and formed of various colors so that when the light rays are projected therethrough, the colors will be constantly changing to attract attention, and lend beauty to the picture projected.

In the operation of the device, it might be stated that the device is especially designed for advertising purposes, the principal object being to project certain advertisements fixed on slides onto a suitable screen.

The required slides are positioned in the rotatable carriage, whereupon the prime mover is started, causing the rotation of the arm 23, through the medium of the gears and pulleys as previously described. During the rotation of the arm 23, the arm 12 which lies adjacent to the arm 23 is engaged by the arm 23 to the end that the rotatable carriage is rotated a distance equal to the distance between adjacent arms 12. During this rotation the shutter 30 is revolving over the openings 34 closing certain openings during the rotation thereof and lending the effect of a moving line of lights to form the border of the picture or advertising matter being projected, it being understood that the lenses of the application used for projecting the slides, as well as the light through the openings 34 of the member 33, are focused to a point in substantially the same general area.

During the rotation of the rotatable carriage the arm 41 is moved downwardly moving the shutter 42, which is located at the opposite end thereof, upwardly to shut off the light projected through the slide projecting lenses of the machine.

Simultaneously with this movement, the arm 41 moves the member 40 downwardly to uncover the opening within the ring 36, thereby permitting a slide to be projected through this opening while the rotatable carriage is again being moved to bring another slide before the projecting lenses of the machine.

Having thus described the invention, what is claimed as new is:—

1. In a device of the class described, a pair of associated distinct projecting apparatus, a rotatable carriage for carrying slides, operating adjacent to one of the projecting apparatus to display matter contained on the slides supported by the carriage, said projecting apparatus being focused to a common area, a stationary plate disposed before one projecting apparatus, and having a line of openings, means for closing the openings of the plate intermittently, and a shutter mechanism operated by the movement of the carriage.

2. In a device of the class described, a pair of associated projecting apparatus, a plate supported in front of one projecting apparatus, said plate having a central display opening, and a plurality of relatively small openings forming a frame for the central opening, a rotatable member adapted to move in proximity to the relatively small openings to open and close the relatively small openings intermittently, and a shutter for automatically opening and closing the central opening.

3. In a device of the class described, a pair of associated projecting apparatus, a plate arranged adjacent to one projecting apparatus and having a series of relatively small openings arranged therein and having a central opening, a rotatable member having a central opening normally exposing the central opening of the plate, said rotatable member having means to close the relatively small openings when the rotatable member is operating, and means for operating the rotatable member.

In testimony that I claim the foregoing as my own, I have hereto affixed my signature in the presence of two witnesses.

THOMAS G. CRAVER.

Witnesses:
   IVY E. SIMPSON,
   J. R. PATTISON.